(No Model.)
T. McGLEW.
PULVERIZING MILL.
No. 565,176. Patented Aug. 4, 1896.
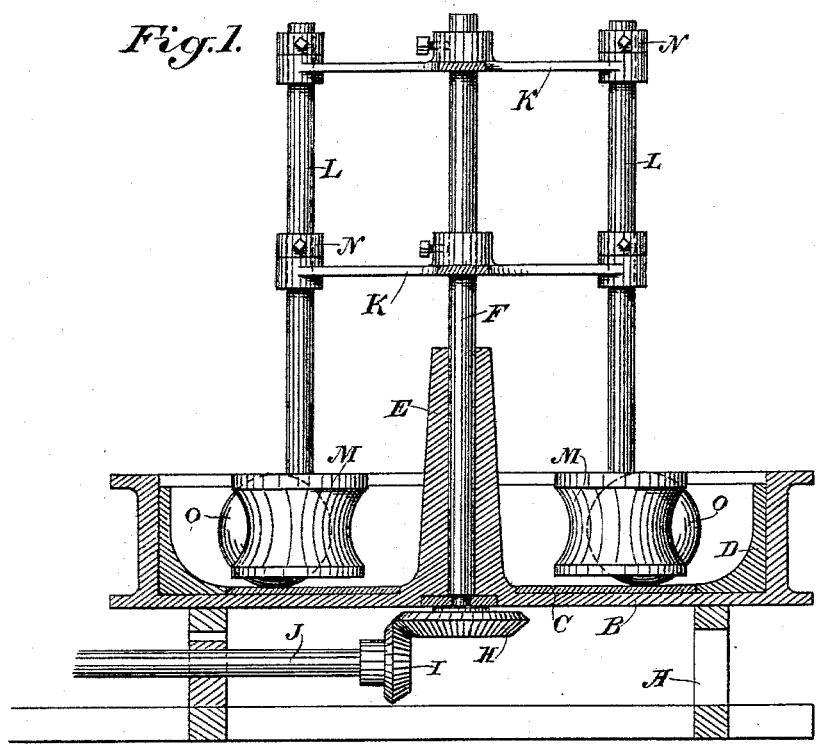
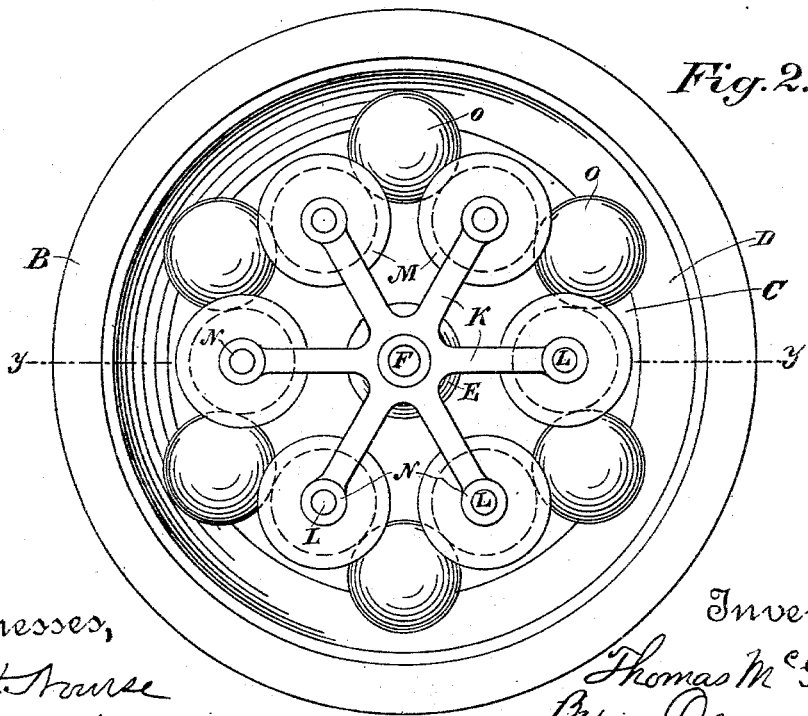

UNITED STATES PATENT OFFICE.

THOMAS McGLEW, OF SAN FRANCISCO, CALIFORNIA.

PULVERIZING-MILL.

SPECIFICATION forming part of Letters Patent No. 565,176, dated August 4, 1896.

Application filed March 4, 1896. Serial No. 581,734. (No model.)

*To all whom it may concern:*

Be it known that I, THOMAS MCGLEW, a citizen of the United States, residing in the city and county of San Francisco, State of California, have invented an Improvement in Pulverizing-Mills; and I hereby declare the following to be a full, clear, and exact description of the same.

My invention relates to an apparatus for pulverizing and grinding ores or other material; and it consists in the combination of a series of vertically-journaled concaved rollers with a circular pan having a concaved die around its periphery and interposed balls, which are caused to travel around between the rollers and the pan by motion transmitted to them through the movement of the rollers around the central axis, and in details of construction, which will be more fully explained by reference to the accompanying drawings, in which—

Figure 1 is a sectional elevation of my mill on line $y\ y$ of Fig. 2. Fig. 2 is a plan view of the same.

A is a framework or base of any suitable description, and B is a pan supported upon the base, preferably having a removable die C in the bottom which will receive the wear and which may be renewed whenever necessary without disturbing the main body of the pan. Around the inner periphery of the pan is a die D, the inner periphery of which is made concave in transverse section, as shown. This die may be made in a continuous piece, or in sections fitting together and set in accurately, so as to form, when in place, a continuous die. The center of the pan has an upwardly-projecting hub E, through which passes a central shaft F. The lower end of this shaft is provided with any suitable form of driving pulley or gear, as shown at H, which is, in the present case, a gear-wheel engaged by a corresponding pinion I upon the horizontal power-shaft J. Through this or equivalent mechanism the vertical shaft may be rotated at any desired degree of speed. The hub is sufficiently high, so that, with the step at the bottom, the shaft is properly guided; but it may, if desired, have a box at the upper end to steady it, and it may also be driven from above, if preferred. Upon this shaft are fixed the spiders K, through the outer ends of the arms of which vertical journals are formed in which the stems or shafts L are adapted to turn freely. These shafts have secured to their lower ends the rollers M. These rollers are made of considerable diameter and have their vertically-disposed faces made concave to correspond with the concavity of the dies D in the pan. The shafts of these rollers are provided with collars N, which are secured to them and rest upon the arms of the spiders, so that the lower faces of the rollers are held sufficiently out of contact with the bottom of the pan.

Between each pair of rollers and the side of the pan is placed a ball O. These balls are of such diameter that they approximately fill the space between the rollers and the inner periphery of the concave die, so that each ball will contact with the inner face of the die and with the concave faces of two adjacent rollers resting also upon the die in the bottom of the pan.

When the apparatus is set in motion, the rollers are carried around the central shaft, and pressing against the balls the latter are caused to roll against the inner periphery of the die, the rotary motion being transmitted in turn from the balls to the rollers also, so that there will be a constant rolling contact between the balls and the inner periphery of the die, and also between the balls and the concave faces of the rollers, as well as upon the bottom die of the pan. Any rock or other material to be pulverized being fed to this pan in proper quantities will be constantly triturated and pulverized by the action of the balls both between themselves and the bottom and side dies of the pan, and also between them and the concave faces of the rollers, thus greatly increasing the capacity of the apparatus and the rapidity of its work.

Having thus described my invention, what I claim as new, and desire to secure by Letters Patent, is—

1. The combination, of a pan having an inner concave or face, a central vertical shaft and mechanism whereby power is applied to rotate it, arms projecting radially from shaft and rotatable therewith, rotatable concave-faced rollers carried by the arms and means whereby they are suspended out of contact with the bottom of the pan, and balls fitting the spaces between each pair of rollers and the periphery of the pan, and freely rotatable, said balls adapted to rotate by contact with the inner periphery of the pan and in turn transmit motion to rotate the rollers upon their own axes while revolving about the center axis.

2. A pan having an interior concave face or die, a vertically-journaled central shaft and mechanism whereby power is applied to rotate it, arms projecting radially from the central shaft and rotatable therewith, shafts loosely journaled in the outer ends of said arms having concave-faced rollers fixed to their lower ends, collars adjustably fixed to the vertical roller-carrying shafts and resting upon the arms whereby the rollers may be suspended out of contact with the bottom of the pan, and balls fitting the spaces between each pair of rollers and the periphery of the pan and revoluble within the pan by power derived from the revolution of the rollers around the central shaft, whereby the balls are caused to rotate by contact with the inner periphery of the pan and in turn transmit motion to rotate the rollers upon their own axes while revolving about the center axis.

In witness whereof I have hereunto set my hand.

THOMAS McGLEW.

Witnesses:
S. H. NOURSE,
JESSIE C. BRODIE.